United States Patent
Sydon et al.

(10) Patent No.: US 6,678,262 B1
(45) Date of Patent: Jan. 13, 2004

(54) METHOD AND DEVICE FOR RADIO TRANSMISSION

(75) Inventors: Uwe Sydon, Düsseldorf (DE); Jürgen Kockmann, Gronau (DE); Hermann-Josef Terglane, Heek (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,198

(22) PCT Filed: Jun. 24, 1997

(86) PCT No.: PCT/DE97/01315
§ 371 (c)(1),
(2), (4) Date: Dec. 16, 1999

(87) PCT Pub. No.: WO98/59436
PCT Pub. Date: Dec. 30, 1998

(51) Int. Cl.⁷ .............................................. H04B 7/212
(52) U.S. Cl. ...................... 370/337; 370/280; 370/347; 370/477; 370/521
(58) Field of Search ................................ 370/280, 345, 370/347, 349, 350, 311, 337, 470, 476, 477, 474, 395.7, 399.71, 295, 296, 521; 455/462, 463, 464

(56) References Cited

U.S. PATENT DOCUMENTS

| | | | |
|---|---|---|---|
| 4,623,922 A | * 11/1986 | Wischermann | 370/521 |
| 4,839,923 A | * 6/1989 | Kotzin | 370/280 |
| 4,949,335 A | * 8/1990 | Moore | 370/280 |
| 5,258,981 A | * 11/1993 | Davey et al. | 370/311 |
| 5,357,516 A | * 10/1994 | Klingberg | 370/280 |

FOREIGN PATENT DOCUMENTS

| | | |
|---|---|---|
| EP | 0 576 079 A1 | 12/1993 |
| EP | 0 615 396 A1 | 9/1994 |
| EP | 0 767 551 A2 | 4/1997 |

OTHER PUBLICATIONS

Phillip D. Rasky et al, entitled: Slow Frequency—Hop TDMA/CDMA for Macrocellular Personal Communications, IEEE Personal Communications (1994), vol. 1, No. 2, New York, pp. 26–35.

Von Dr.–Ing. Klaus David et al, "Digitale Mobilfunksysteme", Stuttgart 1996, chapter 8.1, pp. 372–382.

* cited by examiner

Primary Examiner—Lester G. Kincaid
(74) Attorney, Agent, or Firm—Bell Boyd & Lloyd LLC

(57) ABSTRACT

The invention proposes a method and an apparatus for the radio transmission of user data, arranged in data words of a defined length, in time-division multiplex frames having active time slots in which data are transmitted and inactive time slots in which no data are transmitted. The user data are stored temporarily in a memory at a first data rate, and are read out from the memory and converted into the time-division multiplex frames at a second, greater data rate. During the time period from the beginning of an active time slot to the beginning of the subsequent active time slot, n (n=a whole number $\geq 1$) data words of the user data are thereby respectively stored. By synchronizing the storing and the reading out of the user data, these data can be transmitted with the smallest possible delay in an arbitrarily selected time slot of the time-division multiplex frame.

23 Claims, 4 Drawing Sheets a)

b)

c)

METHOD AND DEVICE FOR RADIO TRANSMISSION

BACKGROUND OF THE INVENTION

1. Field of the Invention

The present invention relates to an apparatus and a method for radio transmission of user data, arranged in data words of a defined length, in time-division multiplex frames that comprise active time slots in which data are transmitted and inactive time slots in which no data are transmitted. The invention is suited particularly for application in digital cordless telephone systems.

2. Description of the Related Art

Since the beginning of the 1990s, there has existed in Europe the DECT (Digital Enhanced Cordless Telephone) standard for cordless telecommunication. This system has ranges of from less than 300 meters up to about 10 km, depending on the antenna and the environment, and is particularly suited for use inside buildings. Both speech signals and data signals can be transmitted.

The DECT air interface is based on a combination of FDMA (Frequency Division Multiple Access=frequency-division multiplexing) and TDMA (Time Division Multiple Access=time-division multiplexing). In a frequency range from 1880 MHz to 1900 MHz, ten carrier frequencies are available, with a respective channel spacing of 1728 kHz. As is described for example in David, Benkner, "Digital Mobilfunksysteme," Stuttgart 1996, chapter 8.1, each carrier frequency is divided into 24 time slots. The first twelve channels are reserved for the downlink from a fixed station to a mobile part of a mobile telephone system, and the following twelve time slots are reserved for the uplink from the mobile part to the fixed station. The 24 time slots form a frame having a total duration of 10 ms. The duration of an individual time slot is thus 417 μs, in which 320 bits of user data, as well as 104 bits of synchronization data, signaling data and error correction bits, can be transmitted. The user data rate thus amounts to 32 kbit/s.

An alternative structure of a time-division multiplex frame is shown schematically in FIG. 2 of the accompanying drawings. The frame duration is again 10 ms. Between the uplink and downlink time slots, in which the data are transmitted from the fixed station to the mobile part or vice versa, there are inactive time slots in which no data are transmitted, respectively arranged between two active time slots. These inactive time slots (blind slots) allow a reprogramming of the frequency of the RF transceive module (frequency hopping) between two successive active time slots. In the present case, the duration of each active time slot is 833 μs and the duration of each inactive time slot is 417 μs, i.e., half of an active time slot. The active time slot has twice the duration of a time slot in the DECT system, and the inactive time slot has the same duration as a time slot in the DECT system. These longer active time slots can be required in order to ensure, despite narrowband frequency channels, a sufficient transmission capacity of, for example, 320 bits per time slot, corresponding to 32 kbit/s. The time duration from the beginning of an active time slot to the beginning of the subsequent active time slot is 1.25 ms. This alternative time-division multiplex frame structure can, for example, be applied in the US-American ISM (Industrial, Scientific, Medical) band, at a carrier frequency of 2.4 GHz.

Independent of the frame structure used, in each time-division multiplex system in a cordless telephone system, the continuous flow of information in both directions of transmission must be compressed into the comparatively narrow time slots. For this purpose, the speech data, coming, for example, from a fixed network line, are stored continuously in a memory, and are then converted, in what are known as bursts (i.e. transmissions with a significantly higher relative data rate), into the respectively selected time slot for radio transmission. In order to enable a qualitatively high-value telephone connection, the time delay that thereby occurs should be as small as possible.

SUMMARY OF THE INVENTION

The present invention is thus based on the object of proposing an apparatus and a method for radio transmission of user data, arranged in data words of a defined length, in time-division multiplex frames made up of active and inactive time slots, whereby, independent of the selected time slot, a minimal time delay occurs in the conversion of the user data.

According to the invention, the object is solved by means of an apparatus and a method for radio transmission whereby n (n=a whole number $\geq 1$) data words of the user data are respectively stored during the time duration from the beginning of an active time slot to the beginning of the subsequent active time slot.

In this way, independent of the selected time slot, at the beginning of the respective time slot the storing of a data word into the memory is always completed exactly at the beginning of the respective time slot, so that the data can be converted into the time slot and transmitted with the smallest possible time delay.

The data word length can thereby be a byte, corresponding to eight bits of the user data. Preferably, five bytes of the user data can respectively be stored during the time from the beginning of an active time slot to the beginning of the subsequent time slot.

According to a preferred exemplary embodiment of the inventive apparatus and of the inventive method, the data rate with which the user data are temporarily stored in the memory is 32 kbit/s, and the rate at which data are read out from the memory is 576 kbit/s.

The time-division multiplex frame can thereby have a total duration of 10 ms, and can be divided into four active time slots having a respective duration of 833 μs for the transmission of data between a fixed station and a mobile apparatus, four active time slots having a respective duration of 833 μs for the transmission from the mobile apparatus to the fixed station, and eight inactive time slots having a respective duration of 417 μs.

The quantity of data transmitted per time slot is preferably 320 bits of the user data. The carrier frequency of the radio transmission can be for example 2.4 GHz. The inventive apparatus and the inventive method can be used for the transmission of speech signals and data signals.

A preferred exemplary embodiment of the inventive apparatus and of the inventive method are explained in the following on the basis of the attached drawings, in which.

DESCRIPTION OF THE PREFERRED EMBODIMENTS

Figure 1:
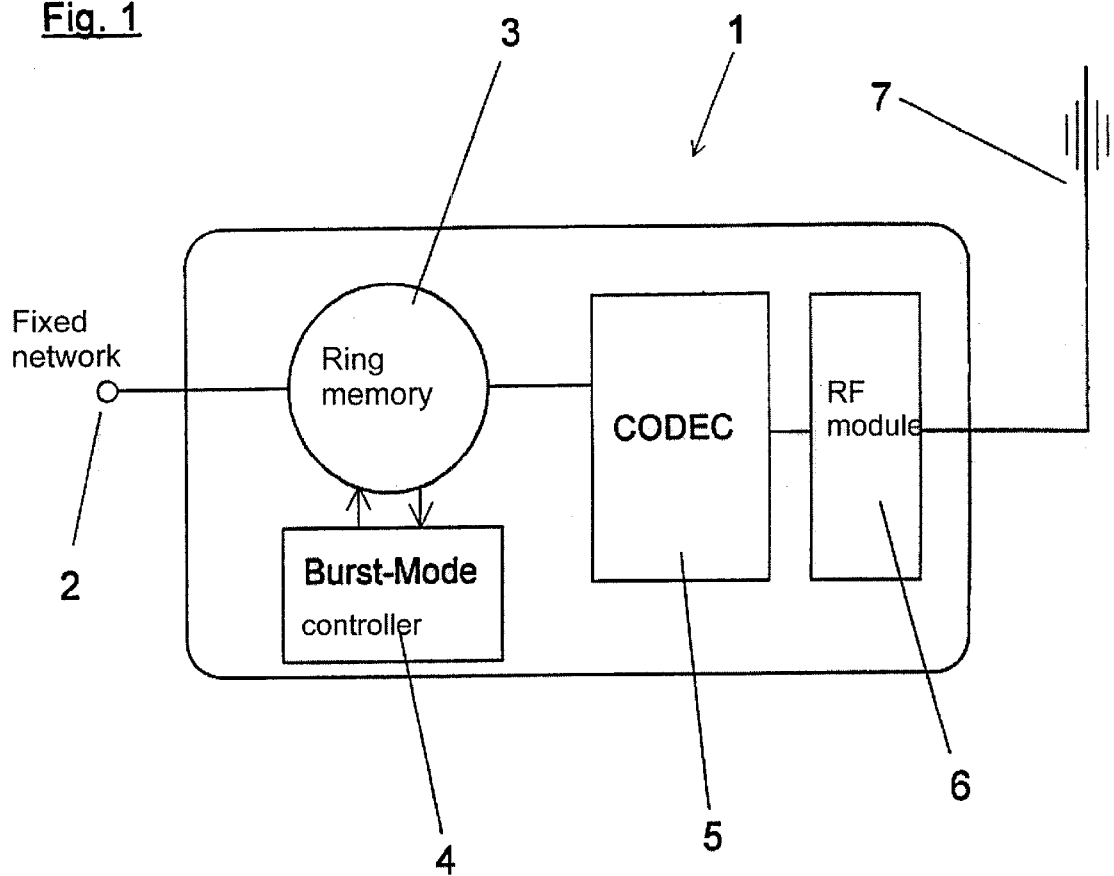
FIG. 1 is a schematic representation of a fixed station of a cordless telephone system to which the invention can be applied.

FIG. 1 schematically shows the design f a fixed station, designated as a whole with 1, of a cordless telephone system to which the invention can be applied. 2 designates a terminal connection to a telephone fixed network, at which the user data can, for example, be received as 32 kbit/s ADPCM (Adaptive Delta Pulsed Code Modulation) coded signals. These user data are continuously written into the memory 3 at the data rate of 32 kbit/s. Due to its logical structure, in which, after a fixed time (10 ms) has expired, the data are respectively again overwritten, the memory is designated a ring memory. Physically, the memory can, for example, be constructed as a direct access memory (RAM). The user data, controlled by the burst mode controller 4, are read out as a burst at a higher data rate of 576 kbit/s, are coded using the coder/decoder 5, and are transmitted to the associated mobile part via the RF module 6 and the antenna 7, with the respectively selected carrier frequency.

Figure 2:
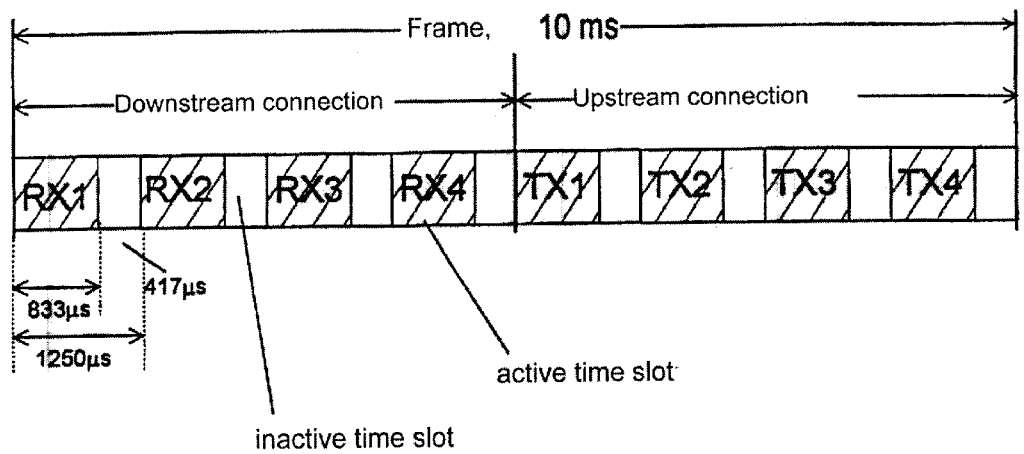
FIG. 2 is a timing diagram schematically showing the time-division multiplex frame structure used in the inventive apparatus and in the inventive method.

The time-division multiplex structure used in the present exemplary embodiment is shown schematically in FIG. 2. The four active time slots RX1 to RX 4, each having a duration of 833 µs, are available for the downlink from the fixed station to a mobile part. The active time slots TX1 to TX 4, likewise 833 µs long, are reserved for the uplink from a mobile part to the fixed station. The designations $Rx_i$ to $Tx_i$ thereby stand for "receive " or, respectively, "transmit " from the point of view of the mobile part. An inactive time slot having a duration of 417 µs is respectively provided between two active time slots. A channel pair, made up of an active time slot and an inactive time slot, thus has an overall duration of 1.25 ms. 320 bits of user data can respectively be transmitted in an active time slot. Given a burst readout rate of 576 kbit/s, the user data are read out in a time period of 320 bits: 576 kbit/s=556 µs. Thus, in each active time slot 833 µs–576 µs=277 µs is still available for synchronization data, signaling data, or the like.

The manner of functioning of the inventive ring memory and of the inventive burst mode controller 4 are explained in the following on the basis of FIGS. 3 and 4.

Figure 3:
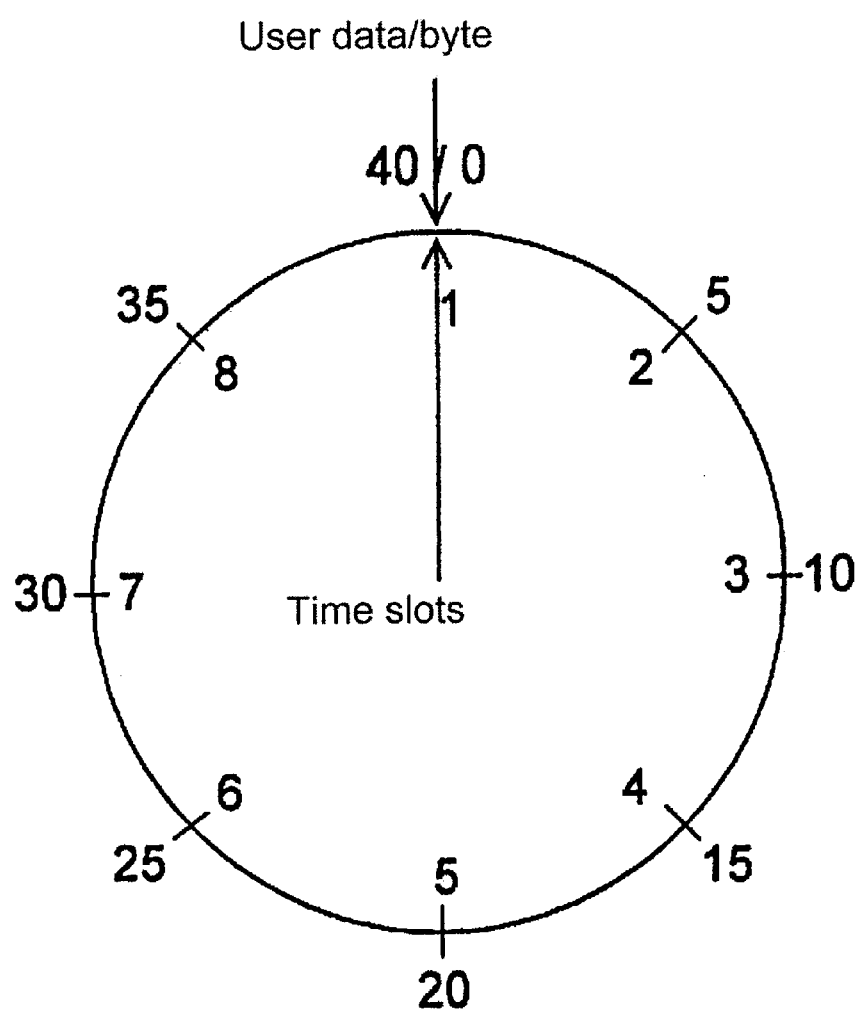
FIGS. 3 and 4 are schematic representations for the explanation of the manner of functioning of the inventive memory means.
Figure 4:
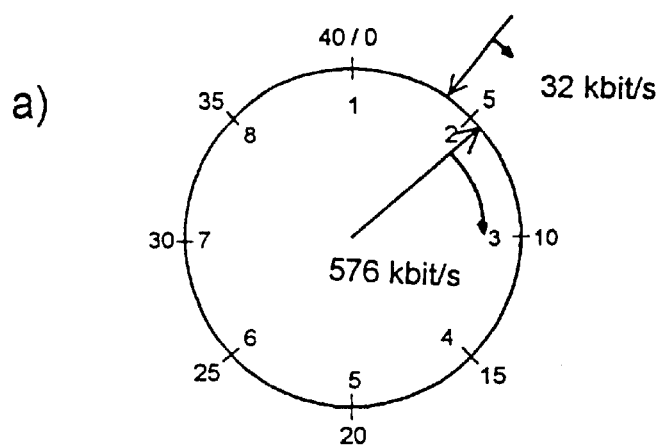
Figure 4:
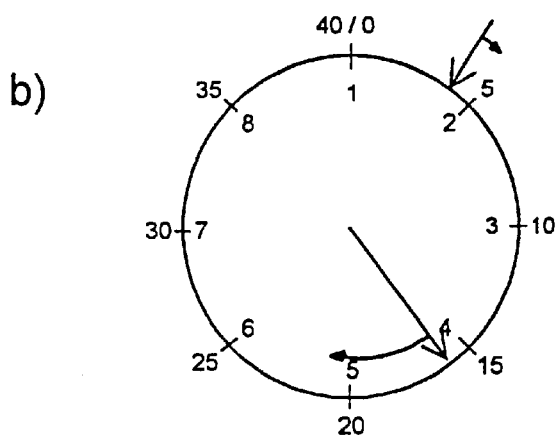
Figure 4:
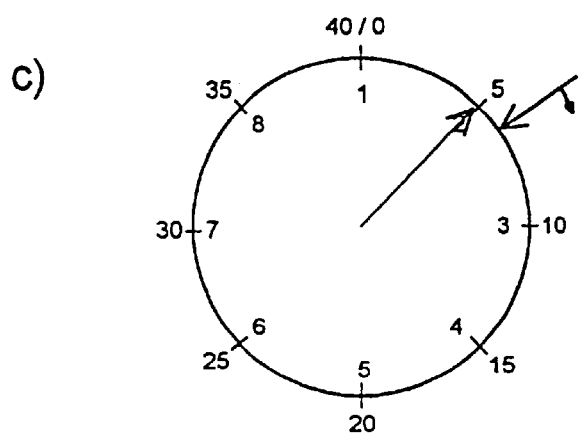

FIG. 3 shows the logical structure of the ring memory. At the outer circumference, the user data are entered in units of bytes. The outer arrow symbolizes the process of storing user data from the fixed network into the ring memory 3. The data are stored continuously at a data rate of 32 kbit/s, i.e., 320 bits, or 40 bytes, in 10 ms. After 10 ms has elapsed, the respective "oldest " data are again overwritten. One complete rotation of the outer arrow thus corresponds to a storing of 40 bytes of the user data during a time period of 10 ms.

The inner arrow symbolizes the process of reading the user data out from the ring memory using the burst mode controller 4. On the inside of the circle, the beginning of an active time slot of the time-division multiplex frame is entered in such a way that the position of the outer arrow indicates the current time slot. The storing of five bytes of user data into the ring memory is always completed exactly at the beginning of a new active time slot. The data can then be read out from the memory without time delay, independent of the selection of the time slot, and can be converted into the respective time slot.

The manner of functioning of the reading-in and reading-out process will now be explained on the basis of FIG. 4. The storing takes place continuously at a data rate of 32 kbit/s, which is symbolized by an outer arrow rotating slowly at a constant speed (see FIG. 4a)., If for example, the second active time slot RX 2 is selected for the radio transmission, the conversion into the time slot begins at position 4 of the outer arrow. The reading-out process takes place at the rapid data rate of 576 kbit/s, so that the reading-out process of the last 40 bytes of user data is completed in 556 µs. The reading-out process of 320 bits=40 bytes of the user data is symbolized by a complete rotation of the inner arrow. During a complete rotation of the inner arrow, the outer arrow, which continues to rotate continuously, arrives approximately at position 6 (see FIGS. 4b and c). In this way, a "touching " of the two arrows, which would symbolize an impermissible simultaneous storing and reading out of the same parts of the memory, can be avoided. The reading-out process is then terminated. This reading-out process repeats every 10 ms.

The inventive radio transmission apparatus and the inventive radio transmission method thus enable a conversion of continuously incoming user data into time-division multiplex frames that is synchronized in such a way that, independent of the selected time slot, a delay results that is minimal and is equally large in all time slots.

What is claimed is:

1. An apparatus for radio transmission of digital user data, comprising:
    a memory for temporarily storing said user data to be transmitted by said radio transmission apparatus, said user data being arranged in data words of a defined length;
    a controller for controlling reads from, and writes to, said memory and for converting said user data into time-division multiplex frames, said time-division multiplex frames comprising active time slots in which said user data are transmitted and inactive time slots in which no user data are transmitted, said controller respectively and continuously writing n (where n=a whole number ≧1) data words of said user data into said memory during a storage time period enveloping a time period from a beginning of an active time slot to a beginning of a subsequent active time slot, and respectively reading from said memory the n data words immediately at the end of the storage time period.

2. An apparatus according to claim 1, wherein:
    said data word length is one byte, corresponding to eight bits of said user data.

3. An apparatus according to claim 2, wherein:
    said controller stores five bytes of said user data during said storage time period.

4. An apparatus according to claim 1, wherein:
    said controller writes said user data into said memory at a data rate of 32 kbit/s.

5. An apparatus according to claim 1, wherein:
    said controller reads said user data out from said memory at a data rate of 576 kbit/s.

6. An apparatus according to claim 1, wherein:
    said controller converts said user data into time-division multiplex frames having an overall length of 10 ms.

7. An apparatus according to claim 6, wherein:
    each said time-division multiplex frame comprises four active time slots for data transmission from a fixed station to a mobile apparatus of a cordless telephone, four active time slots for data transmission from said mobile apparatus to said fixed apparatus of the cordless telephone system, and eight inactive time slots, each arranged respectively between any two said active time slots.

8. An apparatus according to claim 7, wherein:
    the time duration of said active time slots is twice as long as that of said inactive time slots.

9. An apparatus according to claim 8, wherein:
said active time slots each have a duration of 833 μs, and 320 bits of said user data can be transmitted per time slot.

10. An apparatus according to claim 1, wherein:
said radio transmission takes place at a carrier frequency of 2.4 GHz.

11. An apparatus according to claim 1 wherein said user data is speech data.

12. A method for radio transmission, comprising the steps of:
arranging digital user data into data words of a defined length in time-division multiplex frames;
transmitting said user data within active time slots in which data are transmitted of said time-division multiplex frames;
withholding transmitting said user data within inactive time slots in which no user data are transmitted of said time-division multiplex frames;
storing said user data temporarily into a memory at a first data rate during a time period from a beginning of an active time slot to a beginning of a subsequent active time slot, wherein during said time period n (where n is a whole number greater than or equal to one) data words of said user data are respectively and continuously stored;
reading out said n data words from said memory immediately; and
converting said n data words into said time-division multiplex frames at a second data rate which is greater than said first data rate.

13. A method according to claim 12, wherein:
said data word length is one byte, corresponding to eight bits of said user data.

14. A method according to claim 13, wherein:
five bytes of said user data are respectively stored during said time period.

15. A method according to claim 12, wherein:
said first data rate is 32 kbit/s.

16. A method according to claim 12, wherein:
said second data rate is 576 kbit/s.

17. A method according to claim 12, wherein:
said time-division multiplex frame has a length of 10 ms.

18. A method according to claim 17, wherein:
said time-division multiplex frame comprises four active time slots for data transmission in a defined direction, four active time slots for data transmission in an opposite direction of said defined direction, and eight inactive time slots, each arranged respectively between any two said active time slots.

19. A method according to claim 18, wherein: a time duration of said active time slots is twice as long as that of said inactive time slots.

20. A method according to claim 19, wherein:
said active time slots each have a duration of 833 μs.

21. A method according to claim 12 wherein:
said step of transmitting said user data further comprises the step of transmitting 320 bits of user data per time slot.

22. A method according to claim 12, further comprising the step of:
using a carrier frequency of 2.4 GHz for said radio transmission.

23. A method according to claim 12, wherein said user data is speech data.

* * * * *